United States Patent [19]

Linstroth et al.

[11] Patent Number: 4,942,616
[45] Date of Patent: Jul. 17, 1990

[54] INTERACTIVE SYNTHESIZED SPEECH QUOTATION SYSTEM FOR BROKERS

[76] Inventors: Thomas Linstroth, 2305 Argonne Dr. NE., Minneapolis, Minn. 55421; Michael A. Franey, 4213 Xerxes Ave. S., Minneapolis, Minn. 55410; George C. Idzorek, 1175 Iris #34, Los Alamos, N. Mex. 87544

[21] Appl. No.: 774,052

[22] Filed: Sep. 9, 1985

[51] Int. Cl.[5] .................... G10L 5/02; G06F 15/20; H04M 11/00
[52] U.S. Cl. ..................... 381/51; 364/408; 340/825.27
[58] Field of Search ................ 381/51–53; 364/513.5, 408; 379/88–89, 93, 95–97; 340/825.26, 825.27

[56] References Cited

U.S. PATENT DOCUMENTS

| | | | |
|---|---|---|---|
| 3,082,402 | 3/1963 | Scantlin | 340/825.26 |
| 3,716,835 | 2/1973 | Weinberg et al. | 340/825.27 |
| 3,976,840 | 8/1976 | Cleveland et al. | 340/825.26 |
| 4,016,540 | 4/1977 | Hyatt | 381/51 |
| 4,473,824 | 9/1984 | Claytor | 340/825.27 |
| 4,489,438 | 12/1984 | Hughes | 381/51 |
| 4,554,418 | 11/1985 | Toy | 379/88 |
| 4,577,062 | 3/1986 | Hilleary et al. | 379/88 |
| 4,598,367 | 7/1986 | DeFrancesco et al. | 364/408 |
| 4,649,563 | 3/1987 | Riskin | 379/97 |
| 4,672,660 | 6/1987 | Curtin | 379/88 |
| 4,700,378 | 10/1987 | Brown | 379/95 |

OTHER PUBLICATIONS

Gould, "Fidelity's Automated Voice Response System", Telecommunications, Jan. 1981, pp. 27–28.
Ad from Perception Technology Corporation, Business Week, Aug. 26, 1985, p. 96.
Article "Tools for Heavy Hitters", Forbes, May 6, 1985, p. 105.
Pamphlet, "Fast-The Fidelity Automated Service Telephone" (Fidelity Group)
Ad for "Dowphone" by Dow Jones & Company, Inc. ©1984.
Pamphlet for "Stockquote Hotline" for Norwest Brokerage Service, Inc.

Primary Examiner—Gary V. Harkcom
Assistant Examiner—John Merecki
Attorney, Agent, or Firm—Merchant, Gould, Smith, Edell, Welter & Schmidt

[57] ABSTRACT

Apparatus for use by a broker including a memory for holding a number of market prices each corresponding to a security or a commodity. A speech synthesizer provides that prices may be quoted to customers in a synthesized human voice. A telephone interface connects outside calls to a DTMF transceiver which is in turn connected to a programmed microprocessor unit so that a caller may key in instructions or information. Instructions for price quotations result in the price for the selected security or commodity being reported to the caller in a synthesized human voice. The apparatus is also capable of monitoring price triggers and reporting violations of price triggers by calling a predetermined telephone number and reporting the violation in a synthesized human voice. Also, price requests are logged and the unit is responsive to an instruction keyed in by a broker through his telephone to report the contents of the log over the telephone in a synthesized human voice.

32 Claims, 3 Drawing Sheets

INTERACTIVE SYNTHESIZED SPEECH QUOTATION SYSTEM FOR BROKERS

TECHNICAL FIELD OF THE INVENTION

The present invention relates generally to the field of electronic equipment for storing and disseminating data and more particularly to the automated dissemination of data in a brokerage house environment.

BACKGROUND OF THE INVENTION

The typical securities or commodities broker spends a considerable amount of time on the phone each day quoting current prices to customers. Brokers generally encourage client inquiries of this nature in order to develop a rapport with clients through which they keep appraised of their client's current interests in the market. By the same token customers of brokerage houses expect their broker to be available to supply desired quotations, and are generally appreciative of the service.

While the manual dissemination of quotations as described above is generally satisfactory, there are many instances where the broker would just as soon not be bothered, or the customer would just as soon not bother the broker. Nevertheless, the broker still desires to keep close tabs on his client's interests, many times from hour to hour and even minute to minute. And, customers still desire up-to-the-minute quotations notwithstanding their reluctance to pester the broker.

Often times, the customer requests that when a security reaches a specified price the broker should notify the customer or should buy or sell the security for the customer. Thus, a broker is often left the undesirable task of tracking prices for a number of securities and notifying customers and/or executing trades when "trigger" levels are reached. Obviously, the fast moving nature of the market and the dynamic nature of the customer requests make this a difficult and time consuming task.

In response to the above-described situations, the present invention provides an automatic computer controlled quotation system whereby quotations are disseminated to customers in computer synthesized speech and whereby customer inquiries may be monitored by the broker on an ongoing basis if desired. In addition, the present invention provides that securities prices may be monitored and reported to customers when they reach a predetermined price.

SUMMARY OF THE INVENTION

The present invention provides an interactive securities quotation and monitoring system for brokers. According to its more general aspects the system is installed at an individual broker's desk and is connected to an outside line and the broker's telephone. The system includes means for connecting to a data link via which market quotations may be acquired and means for storing acquired quotations in a digital memory for reference. The system further includes telephone interface means connected to the outside line wherein outside calls may be answered or calls to the outside may be initiated. Tone detector means are provided for monitoring tones generated by a caller and converting tones to corresponding digital data. Speech synthesizer means are connected to the telephone interface means whereby synthesized human speech may be produced on the telephone line under digital control. Control means are connected to the tone detector means so as to be responsive to digital control data produced thereby. The control means includes means responsive to predetermined digital control data produced by tone detector means for recalling a quotation from digital memory and for causing the synthesizer means to report the recalled quotation in a synthesized human voice over the telephone line, whereby callers may request quotations via the telephone.

According to yet another aspect of the invention the control means includes further means responsive to predetermined digital control data to set one or more security or commodity trigger levels in the memory, and means responsive to the triggers to monitor the price of the commodity or security and if a trigger is violated dial a predetermined telephone number and make a synthesized voice report.

According to yet another aspect of the invention the control means includes means for receiving an identification number from a caller, displaying a caller's request on a digital display, and logging individual requests in memory for later review. According to this aspect of the invention the control means further includes means responsive to predetermined digital control data to report each item in the caller log in synthesized human voice, whereby a broker may interrogate the system from his office telephone or from a remote telephone. These and other salient features of the invention, together with the more subtle aspects thereof, will be described in more detail below in the ensuing specification with reference to the drawings.

DETAILED DESCRIPTION OF THE INVENTION

Figure 1:
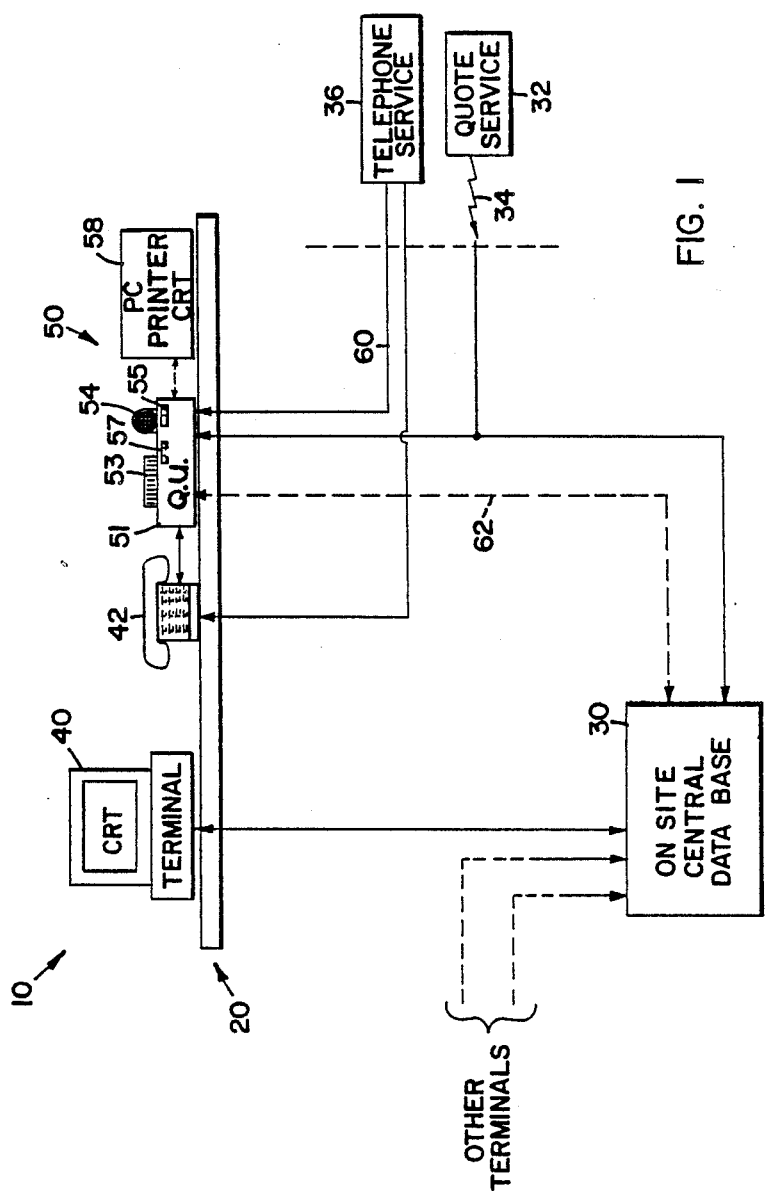
FIG. 1 is a simplified schematic block diagram of the telephone and securities quotation equipment in a typical broker's office, including in addition thereto the quotations system of the present invention.

Referring to FIG. 1 there is illustrated in simplified block diagram form the essential equipment provided in a brokerage house 10, and in particular at each broker's desk 20. Typically, a brokerage house includes an on-site computerized central data base 30, in which there is stored the current prices of the various securities or commodities traded by the house. For instance, a typical stock brokerage data base would include a listing of all New York, American, National Over the Counter and Local Over the Counter stock exchange securities and their current prices.

Computerized data base 30 is typically connected to a data source or quote service 32 which communicates trades made on the floors of the various exchanges via a data link 34, for example in FM subcarrier link, a microwave link or a dedicated telephone line. Normally the data from the data source would be in the form of a "ticker tape" stream from the securities exchanges, with each trade on the exchange reported in the form of an identification of the particular security, the transaction (for example last price, high or low or opening price), and the actual price ("quote"). Data sources of this type are commercially provided by Quotron Corp. and Commodities News Service's Data Quote VII among others. Computerized data base 30 monitors the incoming ticker tape quotations from the quote service 32 and maintains a data base of current securities quotations. These quotations may be accessed through a terminal 40 on a broker's desk 20. Terminal 40, which is typically one of a considerable number of terminals interfaced with data base 30, provides for the selective accessing of any one of the various quotes maintained in data base 30.

Also provided at the brokers desk 20 is a "desk" telephone 42, which is connected in a conventional fashion to an outside telephone service 36, optionally through a private branch exchange (PBX) (not shown), whereby a broker may call and receive calls from customers.

Thus, there is described above the typical basic brokerage house equipment. With this arrangement a broker may monitor current prices via the terminal 40 and communicate with clients through telephone 42, receiving instructions to buy or sell, making recommendations and providing quotations to customers who may call.

As indicated above, the present invention provides an automated quotations system which may be used by a broker and which may perform the function of providing up-to-the-minute securities quotations to customers without broker intervention and permitting, among other things, the broker to monitor customer inquiries whereby the broker stays appraised of the customer's interests. The system of the present invention is generally designated with reference numeral 50 in FIG. 1. The system includes a microprocessor or "quotation" unit 51, which preferably includes a LED/LCD digital display 53 and a speaker 54. Connected to unit 51 is a telephone 42, and optionally an I/O device 58, which would preferably be either a printer or a CRT, or optionally a personal computer. Microprocessor unit 51 is further connected to an outside line 60 of telephone service 36, most likely through a PBX (not shown). Unit 51 is connected to a quote service 32 via data link 34. As indicated above, link 34 could be an FM radio sideband broadcast, satellite transmission or telephone lines. In an alternate embodiment, as will be explained below, unit 51 may be connected through a data path 62 to central data base 30, instead of being connected to quote service 32.

Generally, in operation, system 50 may generate and receive phone calls over line 60 to either respond to a caller's request for securities or commodities quotations or dial a number and report the price of a security when it reaches a specified level. To respond to requests and in order to be programmed, quotation unit 51 is responsive to instructions expressed in sequences of numbers (tones) from a caller's DTMF (Touch Tone ®) phone or hand held tone generator. In the case where a quotation is requested, unit 51 retrieves the quotation from its internal data bank and delivers the quotation to the customer in synthesized human speech. Preferably, customers must enter a customer identification code in order to access quotations. Entered identification codes may be displayed on digital display 53 and stored in RAM 72 (see FIG. 2) for later reporting, via which the broker may monitor customer's inquiries. Speaker 54 may also be activated whereby the broker may listen to what is quoted for the customer. In addition, unit 51 is preferably responsive to a special code entered by a caller so that his call may be rung through to telephone 42, via which the customer may communicate with the broker. These and the other functions of the present invention will be described in more detail below.

Figure 2:
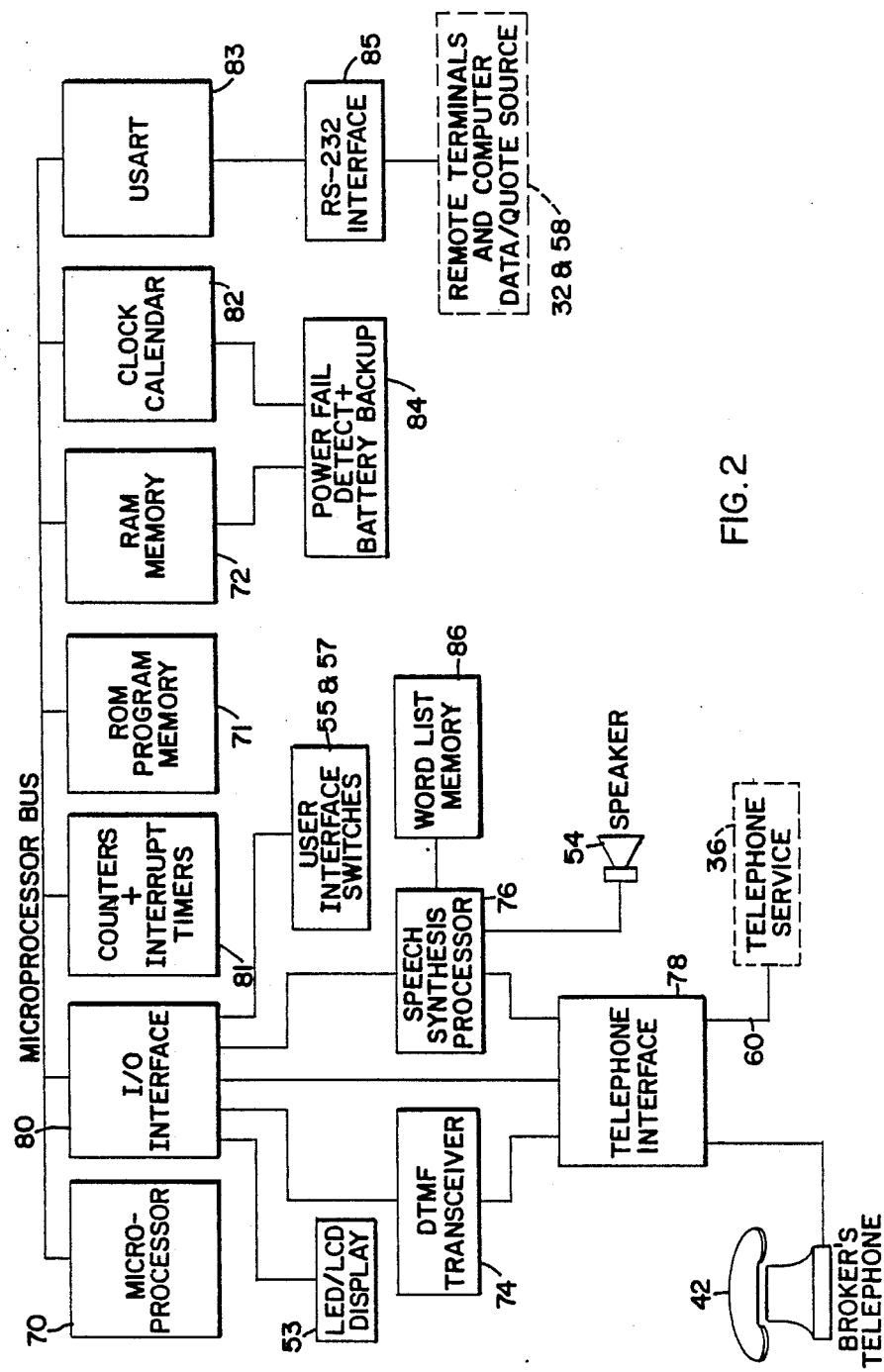
FIG. 2 is a simplified schematic block diagram of the automated quotation device according to the present invention.

Referring now to FIG. 2 there is shown in simplified schematic block diagram form quotation unit 51. Unit 51 includes at its heart a microprocessor 70, coupled in a conventional manner via a bus to a ROM 71 and RAM memory 72, which preferably has a capacity in the range of 16K to 48K. Microprocessor 70 is further connected via the bus to an I/O interface 80, counters and interrupt timers 81, clock calendar circuit 82 and a USART 83. Calendar circuit 82 and RAM 72 are backed up in case of power loss by battery backup 84. Microprocessor 70 is connected via the bus and I/O interface 80 to a DTMF transceiver (tone detector/dial) circuit 74 (preferably an integrated circuit embodiment), a speech synthesis processor 76, and a telephone interface 78.

Telephone interface 78 is connected to transceiver 74 and speech processor 76, which is connected to a word list memory 86. Telephone interface 78 is further connected to outside lines 60, and to telephone 42, while speech processor 76 is connected to speaker 54. Microprocessor 70 is connected via the bus and USART 83 and RS-232 interface 85 for receiving data from data source or quote service 32, and optionally for I/O with I/O device 58, which as mentioned above is preferably a CRT or printer, or optionally a personal computer.

User switches 55 and 57 are connected to I/O interface 80. Switch 55 is an enable/disable switch. In the enable position line 60 is connected to interface 78 and unit 51 is operable to respond to telephone requests and instructions. In the disable position telephone 42 is connected directly to outside line 60, thereby bypassing unit 51, which is thus disabled. Switch 57 simply activates and deactivates speaker 54.

Figure 3:
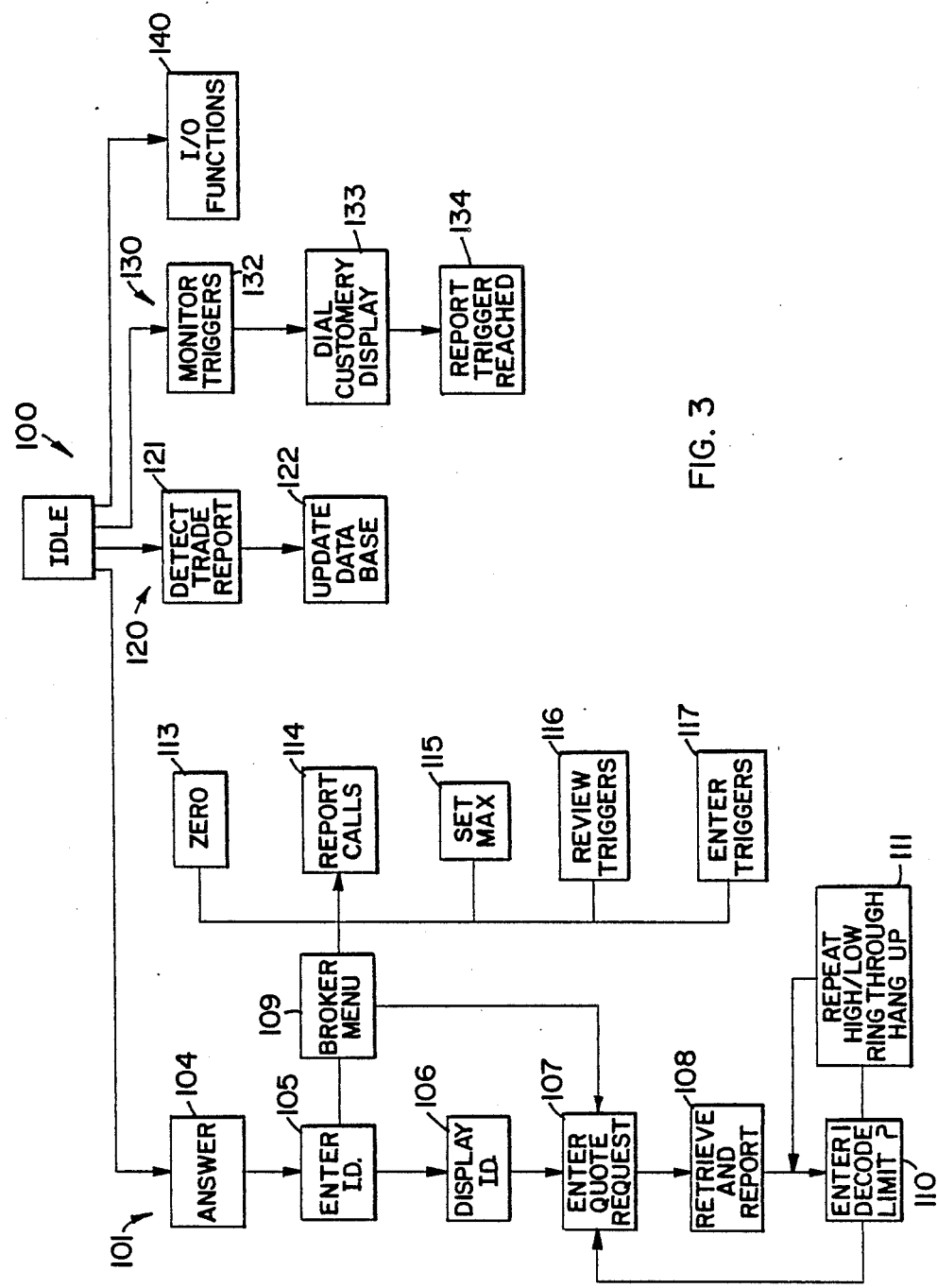
FIG. 3 is a simplified functional block diagram of the software aspect, of the present invention.

Referring now to FIG. 3, which is a simplified functional block diagram of the software 100 of the present invention, the general operation of the system of the invention will be explained. Software 100 (operable in microprocessor 70) is preferably maintained in ROM 71. In its preferred form, software 100 includes an IDLE routine from which it may branch to any one of three different operational routines or modes. A first ANSWER mode 101 provides for the answering of calls on outside line 60, and for responding to requests and programming instructions. In this mode of operation a ring is detected via telephone interface 78 and the call is answered (104). Preferably, the calling party or customer enters an identification code which is decoded at transceiver 74 and verified in microprocessor 70 (105). If the identification code is not verifiable, the caller is preferably given up to three more attempts to enter a valid code. If a valid code is not entered in the allotted tries microprocessor 70 causes telephone interface 78 to say "good-bye" and hang-up on the caller.

Assuming that a valid identification code is entered, the identification code is displayed (106) on digital display 53. Optionally, the caller's name may be maintained in RAM 72 and may be looked up and displayed in lieu of or in addition to the caller's identification number, whereby the caller may be readily identified by the broker. Otherwise, the broker would refer to a cross reference list of identification numbers and customers. Also, if the identification code indicates that the caller is the broker, a special set of menu functions (109) are made available, as will be explained below. In this manner the broker may "program" or interrogate the unit entirely by telephone.

As represented by block 107, once inside the system the customer or broker may key in a request via the push button dial on his or her telephone (or via a tone generator). Preferably, the customer is provided with a list of the various securities or commodities with which the broker deals, with each security or commodity having associated therewith on the list a four digit alpha or numeric code. Thus, the customer or broker may key in the code associated with the desired quotation, and that code may be decoded by transceiver 74 and microprocessor 70 wherein the proper quotation may be retrieved and reported (108). As will be explained below, current quotations are preferably maintained in RAM memory 72 of unit 51, as maintained by DATA routine 120.

Speech processor 76 is activated by microprocessor 70 to report quotations to the caller in a synthesized human voice. For this purpose processor 76 is connected to telephone interface 78, and outside lines 60. If desired, speaker 54 may be activated via on-off switch 57, and the quotations synthesized by processor 76 may be audibly monitored by the broker.

After a quote is given, unit 51 prompts (110) for another request, provided that a maximum number of allowable requests per call has not been exceeded. If another four digit commodity or security code is entered the program returns to function 107 and the new quotation is retrieved as described above. Alternatively, if the caller enters "#0" the previous report is repeated (111). If the caller enters "#1" the high/low/open/change/last prices are reported for the previously selected commodity (111). If the caller enters "#2" the microprocessor 70 sounds a tone through speaker 74 and causes (111) telephone interface 78 to connect the customer's call to telephone 42, which may then be physically answered by the broker. If "#9" is entered by the caller interface 78 is directed to hang up the call (111). Preferably, unit 51 is programmable to limit the number of consecutive quotations that a customer (there is no limit for the broker) may request in one call. Thus, once the preset limit is reached, unit 51 would notify the caller that the limit has been reached and automatically hang up. Also, any time there is more than twenty seconds of delay while unit 51 is waiting for a tone entry it declares that it is going to disconnect and automatically hangs up.

As indicated above, there is provided a special menu when the caller is identified as the broker. Six different functions are offered to the broker by entering the respective selection codes "1", "2", "3", "4", "70" and "71". The menu function selected by "1" is the same quotation reporting function as described above and is available to customers. However, there is no limit on the number of requests the broker may make. And, there is provided a control code, preferably "#8" via which the broker may exit the quotation routine and return to the main broker menu from routine 110.

The second function (113) available to the broker permits the broker to zero the caller log (established by the routine 107). Thus, the caller log may be zeroed simply by entering "2". The third function available to the broker ("3") is a caller log report function via which the broker may interrogate the quotation unit 51 and receive a synthesized voice report as to what customers have called and what quotations were requested. Preferably, the total number of calls presently logged is first reported, and then each call is reported by caller and commodity or security beginning with the last call and proceeding backward. And, the unit is preferably responsive to the entry of any tone during the pause between each report in order to terminate the log report.

The "4" function (115) permits the broker to set the maximum number of requests for quotations that each customer or caller will be permitted to make in any one call. In response to the "4" code, the unit reports the current limit and then asks for a new value. The new value may then be entered, and stored for later reference. Preferably, a default value of 10 requests maximum is automatically established upon power up.

Price triggers, which permit the unit 51 to monitor the price of a commodity or security and alert the customer or broker when a specified trigger value is reached, may be entered, reviewed and deleted via broker functions 116 and 117, which may be accessed via control codes "70" and "71", respectively. Function 116 provides for a review of triggers. Upon receiving "70", the unit 51 lists all the call triggers which are currently active. The triggers are numbered starting with 1 up to the maximum number of triggers permissible, which is preferably 10, but which may be extended if desired. Preferably, the report would orally convey in the following order the trigger number, the security or commodity identification, the trigger level, whether the trigger level is an upper or lower threshold and the telephone number to be called in the case the level is reached. Preferably, after each trigger is reported function 116 is responsive to the entered code "0" to cancel the trigger, "1" to repeat the report, "#" to retain the trigger and "9" code to retain the trigger and skip the rest of the list. In addition, function 116 preferably provides that entering any key while the trigger is being reported will immediately advance the report to the next trigger.

Function 116 also provides that all triggers are automatically cancelled when the markets close. Preferably, the markets are declared closed when unit 51 has not received a live quote for at least one hour. In addition, any trigger set after the markets close will be applied to the next day's trading.

Broker function 117, which is entered by control code "71", permits a trigger to be set by the broker. Upon receiving "71", function 117 prompts for the following information, which it needs in order to set a trigger. First, the commodity or security to be monitored is prompted for. Next, the transaction to be monitored, i.e. the last, high, low, or open price as identified with digits "1", "2", "3" and "4" respectively, are looked for. Next, the price limit or trigger value, for example 36525, is prompted for. Preferably, the limit value or trigger price is entered as a five digit number. Function 117 then prompts to determine whether the trigger denotes an upper threshold or lower threshold price. Finally, the telephone number to be called is prompted for. As many as 18 digits may be entered, a (#) sign indicating the end of input.

As referred to above a DATA routine 120 is provided via which unit 51 monitors data generated via data source 32 in order to update and maintain a quote data base in RAM memory 72. Accordingly, there is provided a hardware interrupt (81) and software means for detecting data incoming from source 32 (121) and for updating the data base (122) as necessary. Unit 51 preferably maintains a complete and current data base of all the quotations which the brokerage house or broker desires to offer to his customers via the system of the present invention. Accordingly, in this regard unit 51 operates in a manner similar to that of the previously described data base 30. As will be readily appreciated by those skilled in the art, the memory requirements for such a data base are relatively minimal, so that the cost for memory for unit 51 is also relatively minimal. As an alternative to maintaining an independent data base in RAM 72, it is contemplated that unit 51 may be connected to an independent data base such as data base 30. This alternative connection is shown as the phantom line data path 62 of FIG. 1. In this manner of operation, unit 51 may retrieve quotations (108) or other data, as the case may be, from data base 30, as well as from RAM 72. Data so retrieved would be otherwise reported in the same manner. Thus, in the case where the data base is too large for storage in a reasonably sized RAM 72 or is to be updated from another source such as a local operator, it may be acquired from an outside system.

A third MONITOR mode of operation, represented by routine 130, is also provided for unit 51. In this third mode of operation unit 51 monitors the active triggers, as set by the above-described broker function 117. Routine 130 thus includes means (132) which are adapted to monitor the selected securities and prices and to detect trigger violations. When a violation is detected it may be displayed to the broker via digital display 53 or announced via speech processor 76 and speaker 54, or the broker may be alerted in some other manner. Preferably, means (133) are also provided in order to activate dial circuit in DTMF 74 to dial the customer or broker via outside line 60, make contact, and report the quotation, as indicated at functional block 134. Again, the software would preferably provide that the customer may ring through to the broker, for example to request a trade (or if desired request synthesized quotes), as explained above with reference to blocks 110 and 111.

As mentioned above, I/O device 58 is preferably either a CRT (display terminal) or a printer. In either case, there is preferably also provided an optional I/O software routine 140 whereby microprocessor 70 may be controlled via alternate input means or may report in alternate formats, for example to a CRT, a printer or a personal computer. As will be readily appreciated where it is desired to keep a written record of transactions the printer would be preferred over, or at least in addition to, the CRT. In the case where a personal computer is interfaced it may be programmed to receive reported data from unit 51 and could either print the report (list) or store it on magnetic disk for later printing or review via its monitor, etc. As indicated, it is also contemplated that unit 51 could be controlled or programmed via routine 140 and a personal computer or keyboard as an alternative to phone-key programming.

Thus, as described above, the present invention provides a system for automatically answering customer inquiries and providing current quotations thereto in a synthesized human voice. The system also provides that the broker may monitor customer calls on an ongoing basis or cause the calls to be logged for later review. In addition, securities and commodities prices may be monitored in accordance with programmed instructions to provide an accurate watch over prices and to provide prompt notification of specified price events. Moreover, the invention is completely operable remotely, via the phone. These basic functions, together with the other advantageous features of the invention thus provide the broker with a more efficient and beneficial manner in which to conduct his daily business, while providing customers with additional services which may be used in connection with the normal broker services.

Although the invention has been illustrated with respect to details of its structure and function, it shall be understood that changes may be made in detail in structure without departing from the spirit and scope of the invention as set forth in the claims appended hereto.

What is claimed is:

1. A system for use by a broker at a broker's workstation in his or her office to assist in quoting the prices of tradable instruments such as securities or commodities to customers, said prices available from a data link to an exchange where the tradable instruments are traded, said system comprising:
   an outside telephone line servicing said office;
   desk telephone handset means at said workstation;
   quote retrieval means connected to said data link for obtaining prices of tradable instruments traded on said exchange;
   telephone interface means connected to said telephone line for answering calls on said telephone line and for converting incoming signals on said telephone line to digital codes, said incoming signals inputted on the remote end of said telephone line;
   signal generating means connected to said telephone line through said telephone interface means for generating communication signals on said telephone line;
   indicator means located at said workstation and perceivable by said broker at said workstation for conveying information to said broker while said broker is at said workstation;
   control means connected to receive said digital codes from said telephone interface means and for controlling said signal generating means, said indicator means and said quote retrieval means, whereby a caller can convey requests and information to said control means using said incoming signals, said control means including:
   (i) price quoting means responsive to a particular sequence of said digital codes representing a request for a quote of the price of particular tradable instrument traded on said exchange for obtaining the price of said particular tradable instrument from said quote retrieval means and for causing said signal generating means to quote the requested tradable instrument price using said communication signals over said telephone line;
   (ii) caller identifying means for obtaining the identification of a caller on said telephone line, said identification obtained from a sequence of said digital codes, and for causing an identification of said caller to be indicated by said indicator means so that it is perceivable by said broker while the caller is on said telephone line obtaining a quote of a price; and
   (iii) switching means operable by said broker from said broker's workstation for selectively connecting said telephone line to said desk telephone handset means whereby a broker can interrupt a call from a caller and speak with the caller in person.

2. A system according to claim 1 wherein said price quoting means includes means for causing said indicator means to indicate the tradable instrument for which a quote is requested.

3. A system according to claim 1 wherein said price quoting means includes local memory means operatively coupled to said quote retrieval means for storing said prices of tradable instruments obtained from said quote retrieval means and further wherein said stored prices in said local memory means are used by said price quoting means for causing said signal generating means to quote said requested tradable instrument price.

4. A system according to claim 1 wherein said quote retrieval means includes central memory means operatively coupled to said quote retrieval means for storing said prices of tradable instruments obtained by said quote retrieval means, and further wherein said price quoting means obtains the price of said particular tradable instrument from said central memory means in said quote retrieval means.

5. A system according to claim 1 wherein said control means further includes call transfer means for causing said switching means to switch said call through to said broker's desk telephone handset means in response to a particular sequence of said digital codes representing a request from said caller to switch said call to said broker's desk telephone handset means so that a caller can call through to said broker after having obtained a quote of a particular tradable instruments and so that said broker can decide whether or not to answer said call depending on who is indicated to be calling by said caller identifying means.

6. A system according to claim 1, 2, 3, 4 or 5 wherein said telephone line is automatically connected through to said broker's workstation when called, and wherein said telephone line terminates at said broker's workstation, whereby said telephone line is dedicated to said broker.

7. A system according to claim 1 wherein said incoming signals are dual tone multiple frequency (DTMF) tones generated by said caller.

8. A system according to claim 1 wherein said communication signals are a synthesized human voice.

9. A method for disseminating price quotations for tradable instruments such as securities or commodities to customers of a brokerage house which receives said price quotations over a data link to an exchange where said tradable instruments are traded, said brokerage house including at least one outside telephone line and a plurality of broker workstations each including at least one desk for a broker and a desk telephone, said method comprising the steps of:
  (a) automatically answering a call on said outside telephone line and establishing a connection with a caller's telephone;
  (b) automatically requesting the caller to signal a caller identification code;
  (c) automatically detecting said caller identification code signal to determine the caller's identification;
  (d) automatically requesting the caller to signal a request for a quote of a price for one of said tradable instruments;
  (e) automatically detecting said price quote request signal to determine the tradable instrument for which the quote is requested;
  (f) automatically obtaining the requested price quote from said price quotations received over said data link;
  (g) automatically quoting the requested price to the caller with communication signals carried on said outside telephone line connected to said caller's telephone;
  (h) automatically indicating to said broker at said workstation during the course of said connection the identification of said caller as determined in step (c); and
  (i) establishing communication between said broker and said caller during the course of said connection in response to the automatic identification of said caller to said broker.

10. A method according to claim 9 further wherein the identification of a tradable instrument for which a price is requested is also automatically indicated to said broker at said workstation during or immediately after the course of said connection.

11. A method according to claim 9 wherein said price quotations are stored in a local electronic memory located at said workstation and further wherein said stored prices are used to quote said requested tradable instrument price.

12. A method according to claim 9 wherein said price quotations are stored remotely from said workstation in said brokerage house and further wherein said requested price quote is obtained from said remote storage location.

13. A method according to claim 9 wherein said method further includes selectively transferring a call to said desk telephone in response to a particular signal by said caller whereby a caller can connect through to said desk telephone after having obtained a quote of a particular tradable instrument, and further wherein said broker can decide whether or not to accept said connected through call depending on who is indicated as calling.

14. A method according to claims 9, 10, 11, 12 or 13 wherein said telephone line is automatically connected through to said broker's workstation when called, and wherein said outside telephone line terminates at said broker's workstation, whereby said telephone line is dedicated to said broker.

15. A method according to claim 9 where said communication signal used to quote said price is a synthesized human voice directly understandable by a human.

16. A system for use by an individual at the individual's workstation in his or her office to assist in providing information to persons calling said office, said information available from a data link to a remote database, said system comprising:
  an outside telephone line servicing said office;
  desk telephone handset means at said workstation;
  information retrieval means connected to said data link for obtaining information from said database;
  telephone interface means connected to said telephone line for answering calls on said telephone line and for converting incoming signals carried on said telephone line to digital codes, said incoming signals inputted on the remote end of said telephone line;
  signal generating means connected to said telephone line through said telephone interface means for generating communication signals on said telephone line;
  indicator means located at said workstation and perceivable by said individual at said workstation for conveying information to said individual while said individual is at said workstation;
  control means connected to said signal generation means, said indicator means, said quote retrieval means and said telephone interface means to receive said digital codes, said control means including:

(i) information communication means responsive to a particular sequence of said digital codes representing a request for information from said database for obtaining the information from said information retrieval means and for causing said signal generating means to communicate the requested information using said communication signals over said telephone line;

(ii) caller identifying means for obtaining the identification of a caller on said telephone line, said identification obtained from a sequence of said digital codes, and for causing an identification of said caller to be indicated by said indicator means so that it is perceivable by said individual while the caller is on said telephone line obtaining said information; and (iii) switching means operable by said individual from said individual's workstation for selectively connecting said telephone line to said desk telephone handset means whereby an individual can interrupt a call from a caller and speak with the caller in person.

17. A system according to claim 16 wherein said information communication means includes means for causing said indicator means to indicate the information which has been requested.

18. A system according to claim 16 wherein said information communication means includes local memory means operatively coupled to said information retrieval means for storing said information obtained from said information retrieval means and further wherein said stored information in said local memory means is used by said information communication means for causing said signal generating means to quote said requested tradable instrument price.

19. A system according to claim 16 wherein said information retrieval means includes central memory means operatively coupled to said information communications means for storing said information obtained by said information retrieval means, and further wherein said information communication means obtains said information requested by the caller from said central memory means.

20. A system according to claim 16 wherein said control means further includes call transfer means for switching said call through to said broker's desk telephone handset means in response to a particular sequence of said digital codes representing a request from said caller to switch said call to said individual's desk telephone handset means so that a caller can call through to said individual after having obtained information and to that said individual can decide whether or not to answer said call depending on who is indicated to be call by said caller identifying means.

21. A system according to claims 16, 17, 18, 19 or 20 wherein said telephone line is automatically connected through to said individual's workstation when called, and wherein said telephone line terminates at said individual's workstation, whereby said telephone line is dedicated to said individual.

22. A system according to claim 16 wherein said incoming signals are dual tone multiple frequency (DTMF) tones generated by said caller.

23. A system according to claim 16 wherein said communication signals are a synthesized human voice.

24. A method for disseminating information from a location which receives said information over a data link to a remote database, said location including at least one outside telephone line and at least one workstation including at least one desk for an individual to work at, said method comprising the steps of:

(a) automatically answering a call on said outside telephone line and establishing a connection with the caller's telephone;

(b) automatically requesting the caller to signal an identification code;

(c) automatically detecting said caller identification code signal to determine the caller's identification;

(d) automatically requesting the caller to signal a request for information from said database;

(e) automatically detecting said information request signal to determine the information requested;

(f) automatically obtaining the requested information from said information received over said data link;

(g) automatically communicating the requested information to the caller with communication signals carried on said outside telephone line connected to said caller's telephone;

(h) automatically indicating to said individual at said workstation sometime during the course of said connection the identification of said caller as determined in step (c); and (i) establishing communication between said individual and said caller during the course of said connection in response to the automatic identification of said caller to said individual.

25. A method according to claim 24 further wherein the information requested is also automatically indicated to said individual at said workstation during or immediately after the course of said connection.

26. A method according to claim 24 wherein said information is stored in a local electronic memory located at said workstation and further wherein said stored information is used to obtain the requested information to communicate to the caller.

27. A method according to claim 24 wherein said information is stored remotely from said workstation in said location and further wherein said information is obtained from said remote storage location.

28. A method according to claim 24 wherein said method further includes selectively transferring a call to said desk telephone in response to a particular signal by said caller whereby a caller can connect through to said desk telephone after having obtained information, and further wherein said individual can decide whether or not to accept said call connected through to said desk telephone depending on who is calling as perceived from said indicator means.

29. A method according to claims 24, 25, 26, 27 or 28 wherein said telephone line is automatically connected through to said individual's workstation when called, and wherein said telephone line terminates at said individual's workstation, whereby said telephone line is dedicated to said individual.

30. A method according to claim 24 where said communication signal used to communicate said information is a synthesized human voice directly understandable by a human.

31. A system for use by a broker at a broker's workstation in his or her office to assist in quoting the prices of tradable instruments such as securities or commodities to customers, said prices available from a data link to an exchange where the tradable instruments are traded, said system comprising:

an outside telephone line servicing said broker's workstation;

database means located in said office for storing prices of tradable instruments, said database means including means for connecting it to said data link for obtaining the prices of tradable instruments traded on said exchange;

quote retrieval terminal means located at said workstation and connected to said database means and manually operable by said broker for obtaining prices of tradable instruments from said database means whereby said broker can obtain quotes of said prices of said tradable instruments;

quote retrieval terminal emulation means located at said workstation, said emulation means including:

(a) telephone interface means connected to said telephone line for answering calls on said telephone line and for converting incoming signals carried on said telephone line to digital codes, said incoming signals inputted on the remote end of said telephone line;

(b) signal generating means connected to said telephone line through said telephone interface means for generating communication signals on said telephone line; and (c) control means connected to said control database, said signal generating means, and said telephone interface means to receive said digital codes, said control means including price quoting means responsive to a particular sequence of said digital codes representing a request by a caller for a quote of the price of a particular tradable instrument for obtaining the price of said particular tradable instrument from said central database means and for causing said signal generating means to quote the requested tradable instrument price using said communication signals over said telephone line.

32. A system according to claim 31 wherein said incoming signals are dual tone multiple frequency (DTMF) tones generated by said caller.

* * * * *

UNITED STATES PATENT AND TRADEMARK OFFICE
CERTIFICATE OF CORRECTION

PATENT NO. : 4,942,616

DATED : July 17, 1990

INVENTOR(S) : Thomas Linstroth, Michael A. Franey, C. Idzorek

It is certified that error appears in the above-identified patent and that said Letters Patent is hereby corrected as shown below:

In the Abstract, line 6, insert "dual tone multiple frequency" before "(DTMF)"

In column 4, line 63 delete --wherebY-- and insert "whereby"

In column 12, line 9 delete --the-- and insert "a"

In column 14, lines 7 and 8, delete --control database-- and insert "database means"

Signed and Sealed this

Twenty-eighth Day of April, 1992

Attest:

HARRY F. MANBECK, JR.

*Attesting Officer*    *Commissioner of Patents and Trademarks*